April 11, 1944.  B. WEISS  2,346,283
SCREW ANCHOR
Filed Nov. 25, 1941

Inventor
Ben Weiss

By Clarence A. O'Brien
Attorney

Patented Apr. 11, 1944

2,346,283

UNITED STATES PATENT OFFICE 2,346,283

SCREW ANCHOR

Ben Weiss, Chicago, Ill.

Application November 25, 1941, Serial No. 420,412

1 Claim. (Cl. 85—32)

This invention relates to new and useful improvements in anchoring means for screws and bolts, the principal object of the invention being to provide a plug element which can be readily driven into a wooden frame or the like to serve as a concealed anchor element and which can accommodate a bolt or screw fastener.

Other objects and advantages of the invention will become apparent to the reader of the following description.

Figure 1:
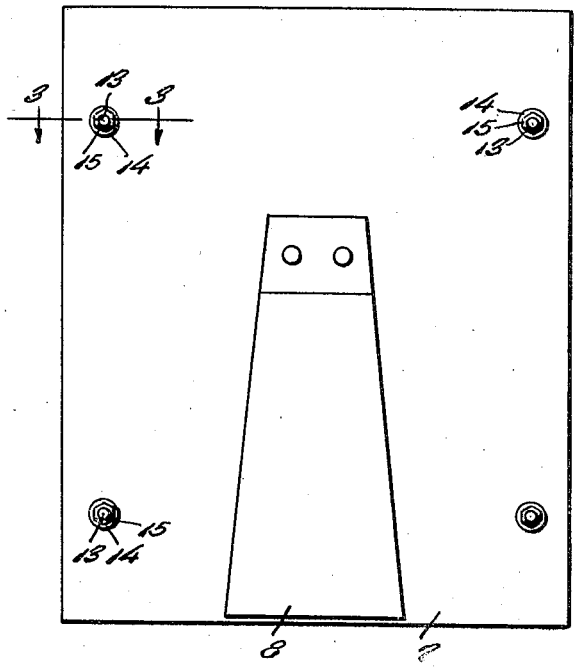
Figure 1 represents a rear elevational view of a picture frame showing a back plate secured in place to the frame.
Figure 2:
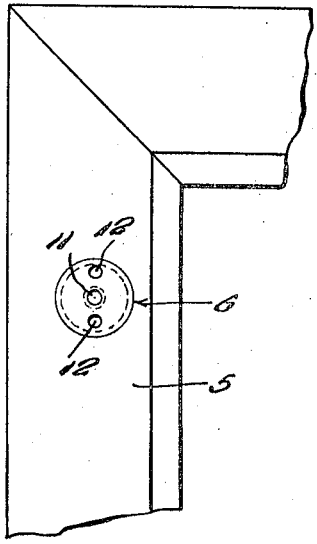
Figure 2 is a fragmentary enlarged rear elevational view of the frame showing one of the anchoring elements in place.
Figure 3:
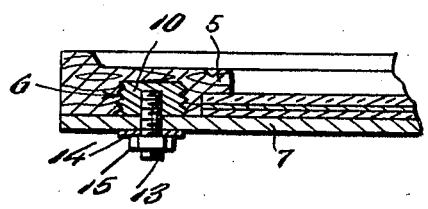
Figure 3 is an enlarged fragmentary detailed sectional view taken substantially on the line 3—3 of Figure 1.
Figure 4:
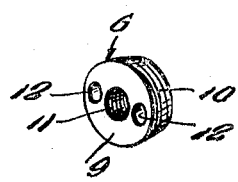
Figure 4 is a perspective view of the tapered anchoring element.

Referring to the drawing wherein like numerals designate like parts, it can be seen that numeral 5 denotes a picture frame into which an anchoring element forming part of the present invention and generally referred to by numeral 6 has been driven. Referring to Figure 1, numeral 7 denotes a picture frame back having a supporting leg 8 attached thereto and this back is held to the frame by fastening means in conjunction with the anchoring element 6.

The anchoring element 6 consists of a metal plug 9 which is tapered longitudinally and provided with threads 10 on its periphery. This plug 9 has a threaded bore 11 extending inwardly from its large end, and at this end several openings 12, 12 can be provided for the reception of a tool such as a pronged screw driver or the like.

It can be seen, that a cylindrical recess is first formed in the frame 5, this recess being of a diameter equivalent to the diameter of the small end of the plug 9. The plug can now be screwed into the recess so that its large end is flush with the back side of the frame 5, and although it be screwed into a shallow recess of a depth no greater than the thickness of the plug, said plug becomes securely anchored by extending a pressure in the recess equivalent to the pressure exerted by the heaviest section of a very long and heavy screw.

A picture frame back 7 can now be formed with openings registering with the openings 11 in the plug 9 and threaded elements 13 can be driven into the recesses 11 after being passed through the openings in the back 7. Washers 14 can be placed on these threaded members 13 and nuts 15 screwed against the same, thus making an easily removable back for framing or reframing photographs and when assembled concealing the raw unfinished back of the frame as well as the plug.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fastening structure comprising a body having a shallow cylindrical recess in one face thereof and having a bottom wall, a tapered cylindrical externally threaded plug turned into said recess flush with the bottom wall of the recess and with said face, said plug having a threaded axial socket therein extending part way therethrough and terminating in a flat bottom, and a threaded stud turned into the socket against said bottom and being longer than said socket to extend therefrom for receiving a nut thereon.

BEN WEISS.